(12) United States Patent
Chou et al.

(10) Patent No.: US 9,374,119 B1
(45) Date of Patent: Jun. 21, 2016

(54) COMMUNICATION DEVICE

(71) Applicants: JIENG TAI INTERNATIONAL ELECTRIC CORP., New Taipei (TW); NATIONAL TAIPEI UNIVERSITY OF TECHNOLOGY, Taipei (TW)

(72) Inventors: Yu-Pang Chou, New Taipei (TW); Chung-Yen Yang, New Taipei (TW); Pei-Zong Rao, New Taipei (TW); Chuo-Hsun Sun, New Taipei (TW)

(73) Assignees: JIENG TAI INTERNATIONAL ELECTRIC CORP., New Taipei (TW); NATIONAL TAIPEI UNIVERSITY of TECHNOLOGY, Taipei (TW)

( * ) Notice: Subject to any disclaimer, the term of this patent is extended or adjusted under 35 U.S.C. 154(b) by 0 days.

(21) Appl. No.: 14/801,811

(22) Filed: Jul. 16, 2015

(30) Foreign Application Priority Data

Mar. 3, 2015 (TW) .............................. 104106677 A

(51) Int. Cl.
*H04M 1/00* (2006.01)
*H04B 1/3827* (2015.01)

(52) U.S. Cl.
CPC .................................. *H04B 1/3838* (2013.01)

(58) Field of Classification Search
CPC ....... H01Q 1/245; H01Q 1/243; H04B 1/3838
USPC .......................... 455/575.5, 575.1, 550.1, 570
See application file for complete search history.

(56) References Cited

U.S. PATENT DOCUMENTS

| | | | |
|---|---|---|---|
| 6,798,288 B1 * | 9/2004 | Jayaraman | H03F 3/2175 330/109 |
| 8,577,289 B2 | 11/2013 | Schlub et al. | |
| 2011/0012793 A1 | 1/2011 | Amm et al. | |
| 2011/0250928 A1 | 10/2011 | Schlub et al. | |
| 2013/0241780 A1 | 9/2013 | Amm et al. | |
| 2014/0357211 A1 * | 12/2014 | May | H04B 1/123 455/234.2 |
| 2015/0257158 A1 * | 9/2015 | Jadhav | H04B 1/04 455/404.1 |

* cited by examiner

*Primary Examiner* — Nghi H Ly
(74) *Attorney, Agent, or Firm* — CKC & Partners Co., Ltd.

(57) ABSTRACT

A communication device is provided. The communication device includes an antenna unit, a sensing unit and a radio frequency unit. The antenna unit is configured to transmit a radio frequency signal. The sensing unit is coupled to a ground terminal through a first capacitor. The sensing unit is configured to sense a capacitance value through the antenna unit. The radio frequency unit is configured to generate the radio frequency signal and to regulate the energy of the radio frequency signal according to the capacitance value.

10 Claims, 3 Drawing Sheets

COMMUNICATION DEVICE

RELATED APPLICATIONS

This application claims priority to Taiwan Application Serial Number 104106677, filed Mar. 3, 2015, which is herein incorporated by reference.

BACKGROUND

1. Field of Invention

The present invention relates to a communication device. More particularly, the present invention relates to a communication device which can avoid affecting the radiation efficiency of an antenna.

2. Description of Related Art

A communication device can emit or receive radio waves through an antenna so as to transmit or exchange radio signals. Because radio waves are a type of high-frequency signal, the radio waves energy is regulated in worldwide countries so as to prevent users from affecting or interfering the operation of other radio communication devices. For example, ICNIRP (International Commission on Non-Ionizing Radiation Protection) suggests that a specific absorption rate (SAR) in humans should not exceed 2.0 W/Kg. The SAR in humans refers to electromagnetic wave power absorbed per unit of mass of an organism in a common electromagnetic radiation environment, and uses W/Kg as a unit. In addition, different communication products, such as mobile phones, tablet computers, hand-held access point devices, etc., are applicable to different environments, so that a factor of distance should be considered.

However, decreasing the interference of the radio communication devices to the external may affect the antenna efficacy. Therefore, conventional skills provide various methods to maintain the antenna efficacy simultaneously with decreasing the interference of the radio communication devices. One conventional skill is to use a proximity sensor to sense an approach of a human body. When the sensor detects a human body approaching, energy of radio signal will be controlled to be decreased. Moreover, when the sensor detects no human body approaching, energy of radio signal will be kept constant or be controlled to be increased. In this condition, requirements of decreasing the interference and maintaining the antenna efficacy can be satisfied. However, a conventional proximity sensor has to include a receiver or sensor formed from metal material for sensing a capacitance change generated by the approach of a human body, thereby determining the proximity of the human body. In other words, the antenna efficacy may be affected by the externally-added receiver or sensor, thus resulting in a narrow operating frequency band. Therefore, besides increasing fabrication and design costs, the conventional skill also affect the occupied area of antenna.

SUMMARY

One object of the present invention is to provide a communication device which can meet the requirements of decreasing the interference and maintaining efficiency of the antenna.

According to the aforementioned object, a communication device is provided. The communication device includes an antenna unit, a sensing unit and a radio frequency unit. The antenna unit is configured to transmit a radio frequency signal. The sensing unit is coupled to a ground terminal through a first capacitor. The sensing unit is configured to sense a capacitance value through the antenna unit. The radio frequency unit is configured to generate the radio frequency signal and to regulate energy of the radio frequency signal according to the capacitance value.

According to an embodiment of the present invention, the communication device further includes a control unit. The control unit is configured to generate and provide a control signal to the radio frequency unit according to the capacitance value, so as to regulate the energy of the radio frequency signal.

According to an embodiment of the present invention, when the capacitance value is greater than a threshold value, the radio frequency unit decreases the energy of the radio frequency signal according to the control signal.

According to an embodiment of the present invention, when the capacitance value is smaller than or equal to the threshold value, the radio frequency unit does not regulate the energy of the radio frequency signal according to the control signal.

According to an embodiment of the present invention, the sensing unit, the radio frequency unit and the control unit are integrated into one package.

According to an embodiment of the present invention, the first capacitor and the ground terminal are disposed in the control unit.

According to an embodiment of the present invention, the communication device further includes a capacitive sensing unit. The capacitive sensing unit is coupled between the antenna unit and the radio frequency unit.

According to an embodiment of the present invention, the capacitive sensing unit includes a second capacitor.

According to an embodiment of the present invention, the sensing unit is coupled to the antenna unit.

According to an embodiment of the present invention, the sensing unit is configured to detect whether a human body approaches the communication device.

According to the above embodiments, the antenna unit of the communication device itself is used to sense the capacitance value within an area range, so as to regulate the energy of the radio frequency signal. In the present invention, there is no need to additionally install the receiver or the sensor in the communication device 100. In addition, some components in the communication device can be integrated into one package to increase the arrangement flexibility of other components in the communication device.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
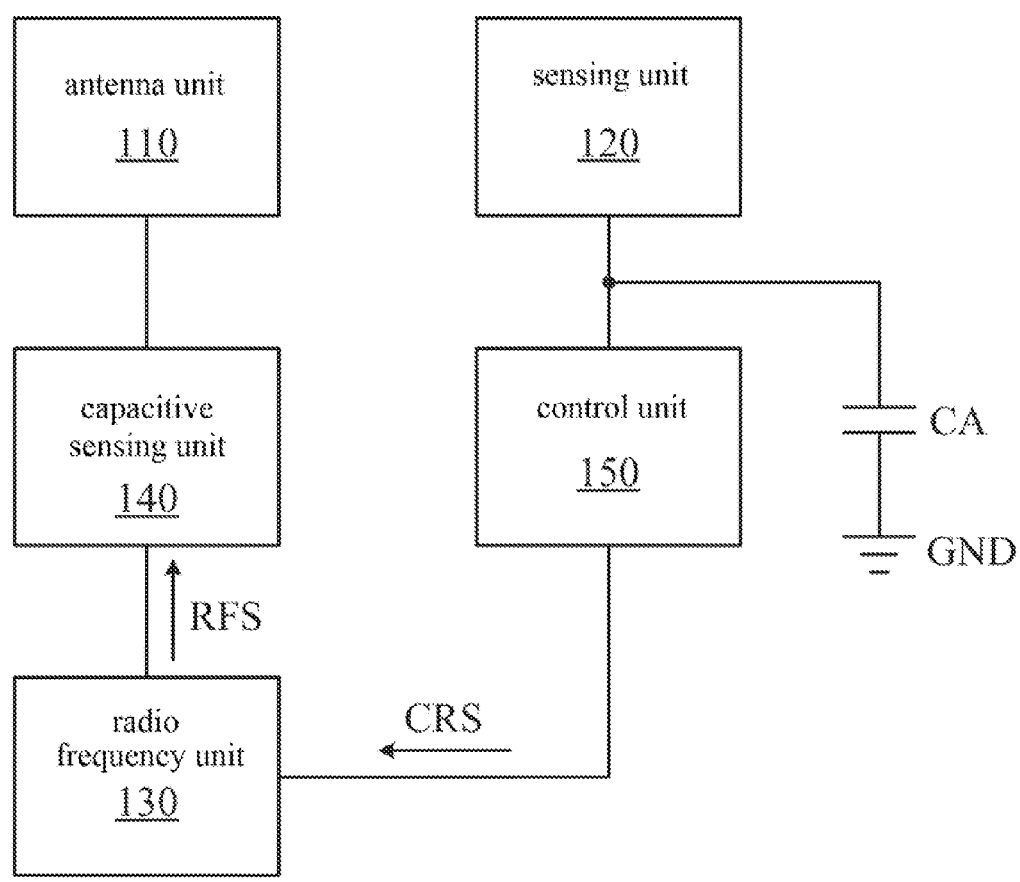
FIG. 1 is a schematic block diagram showing a communication device in accordance with a first embodiment of the present invention.

Reference will now be made in detail to the present embodiments of the invention, examples of which are illustrated in the accompanying drawings. Wherever possible, the same reference numbers are used in the drawings and the description to refer to the same or like parts.

Embodiments of the present invention are disclosed below by drawings. For purpose of clarity, some details in practice will be described together with the following description. However, it should be understood that, these details in practice are not intended to limit the present invention. In other words, in some embodiments of the present invention, these details in practice are not necessary. In addition, for purpose of simplifying the drawings, some conventional structures and components in the drawings will be illustrated in a schematic way.

Referring to FIG. 1, FIG. 1 is a schematic block diagram showing a communication device 100 in accordance with a first embodiment of the present invention. The communication device 100 can be any electrical product having a communication function, such as a mobile phone, a tablet computer, an access point device, etc. As shown in FIG. 1, in the present embodiment, the communication device 100 includes an antenna unit 110, a sensing unit 120 and a radio frequency unit 130. The antenna unit 110 is configured to transmit a radio frequency signal (RFS). The sensing unit 120 is coupled to a ground terminal (GND) through a capacitor (CA). The sensing unit 120 is configured to sense a capacitance value through the antenna unit 110. The radio frequency unit 130 is configured to generate the radio frequency signal (RFS), and to regulate energy of the radio frequency signal (RFS) according to the capacitance value.

Specifically, the sensing unit 120 can be configured to detect whether a human body approaches the communication device 100, so as to decide a specific absorption rate (SAR) for the communication device 100. When a human body approaches the communication device 100, a coupling capacity sensed by the antenna unit 110 is changed. Therefore, the sensing unit 120 can sense a capacitance value of the coupling capacity through the antenna unit 110 and decide whether it is necessary to regulate the energy of the radio frequency signal according to the capacitance value.

In one embodiment, the communication device 100 further includes a capacitive sensing unit 140 and a control unit 150. The capacitive sensing unit 140 is coupled between the antenna unit 110 and the radio frequency unit 130. The control unit 150 is coupled to the sensing unit 120 and the radio frequency unit 130. The sensing unit 120 can sense the capacitance value of the capacitive sensing unit 140 through the antenna unit 110, and transmit the capacitance value to the control unit 150. The control unit 150 can generate a control signal (CRS) according to the capacitance value sensed by the sensing unit 120, and can transmit the control signal (CRS) to the radio frequency unit 130. The radio frequency unit 130 then regulates the energy of the radio frequency signal (RFS) according to the control signal (CRS).

In one embodiment, the control unit 150 may compare the capacitance value sensed by the sensing unit 120 with a threshold value, so as to determine whether a human body approaches the communication device 100. When the capacitance value is greater than the threshold value, meaning that a human body is approaching, the control unit 150 generates the control signal (CRS) to the radio frequency unit 130, so as to notify the radio frequency unit 130 to regulate the energy of the radio frequency signal (RFS). The radio frequency unit 130 then decreases the energy of the radio frequency signal (RFS) according to the control signal (CRS). When the capacitance value is not greater than the threshold value, meaning that no human body is approaching, the control unit 150 generates and provides the control signal (CRS) to the radio frequency unit 130, so as to notify the radio frequency unit 130 not to regulate the energy of the radio frequency signal (RFS).

In addition, in the present embodiment, the sensing unit 120 is coupled to the ground terminal (GND) through the capacitor (CA). Therefore, when the sensing unit 120 is sensing the capacitance value via the antenna unit 110, direct current of the sensing unit 120 is not grounded. Hence, the sensed capacitance value will not be affected.

Figure 2:
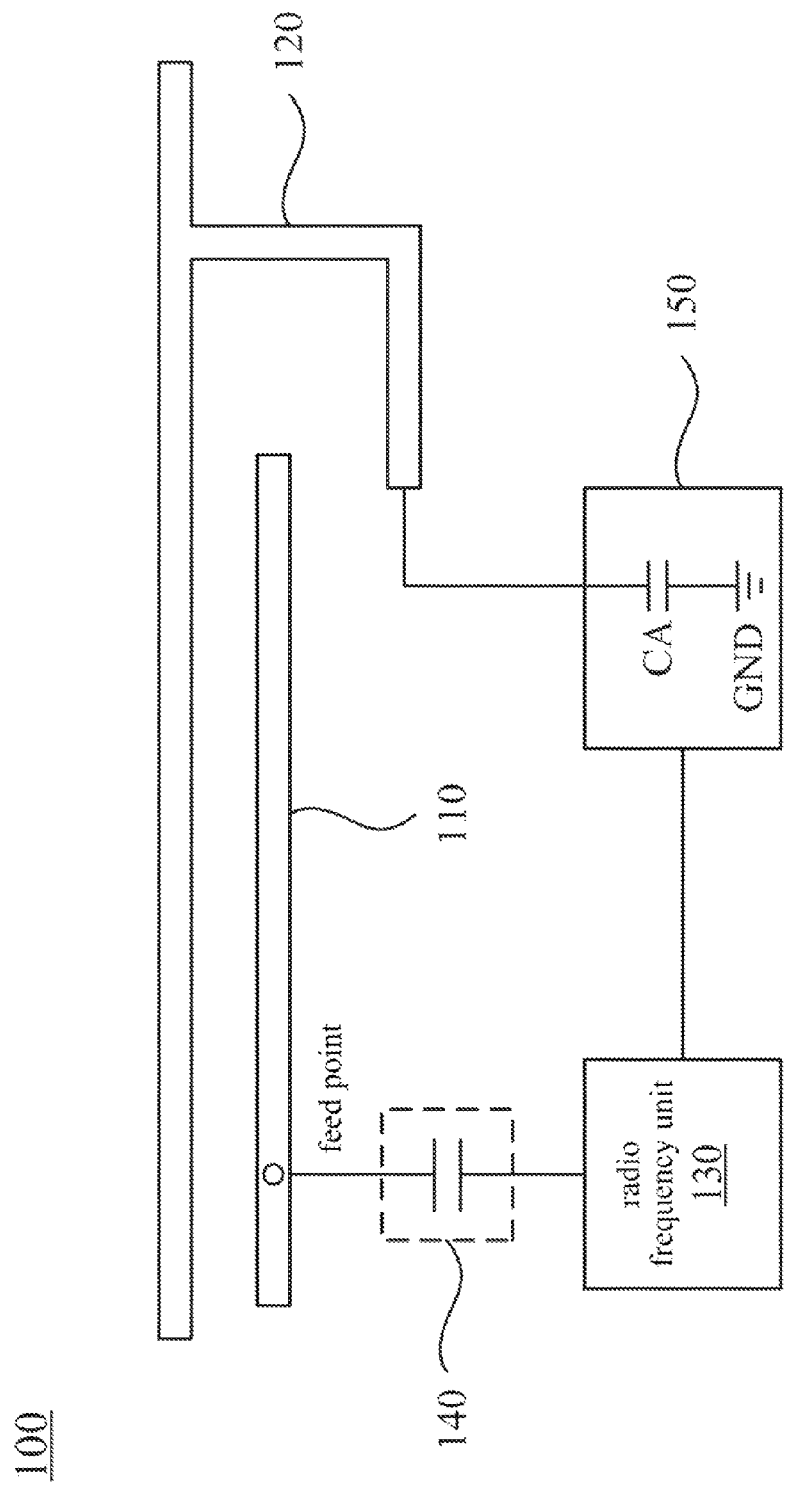
FIG. 2 is a schematic diagram showing the communication device in accordance with the first embodiment of the present invention.

Simultaneously referring to FIG. 1 and FIG. 2, FIG. 2 is a schematic diagram showing the communication device 100 in accordance with the first embodiment of the present invention. It is noted that, in the present embodiment, the configuration of the communication device 100 is merely used as an example for explanation. In other words, various modifications and variations can be made without departing from the scope or spirit of the invention.

In the present embodiment, the sensing unit 120 is coupled to the antenna unit 110. In other words, the antenna unit 110 can be used as a sensing member of the sensing unit 120. Specifically, the present invention uses the antenna unit 110 of the communication device 100 itself to sense the capacitance value within an area range, so as to regulate the energy of the radio frequency signal (RFS). Therefore, there is no need to additionally install the receiver or the sensor in the communication device 100, thus decreasing the fabrication cost and increasing the dimension of the antenna unit 110.

In addition, in the present embodiment, the capacitive sensing unit 140 can be another capacitor, but other embodiments of the present invention are not limited thereto.

Moreover, in the present embodiment, the capacitor (CA) and the ground terminal (GND) coupled to the sensing unit 120 are disposed in the control unit 150, but other embodiments of the present invention are not limited thereto. In other embodiments, the capacitor (CA) and the ground terminal (GND) can be disposed outside of the control unit 150.

Figure 3:
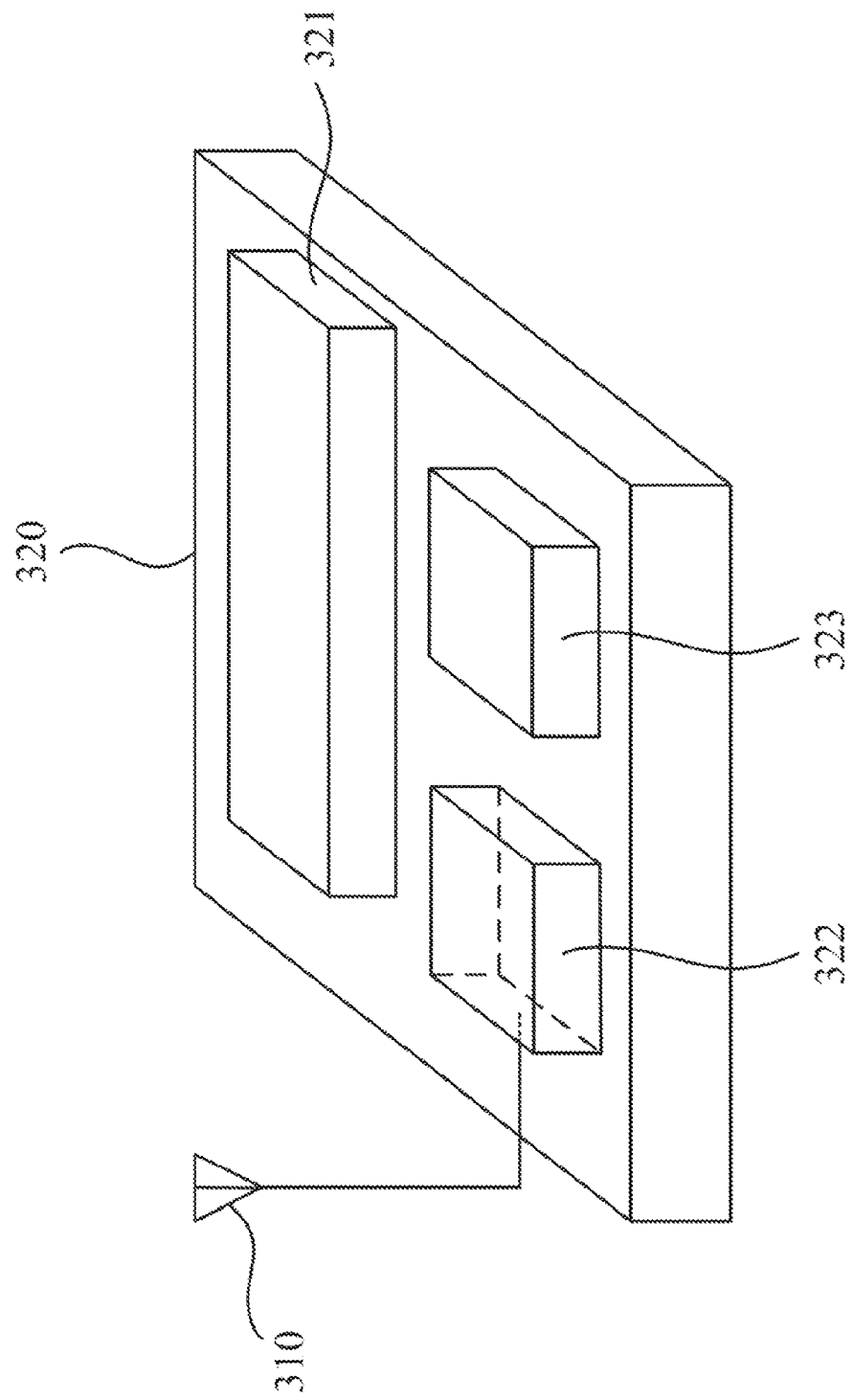
FIG. 3 is a schematic diagram showing a communication device in accordance with a second embodiment of the present invention.

Referring to FIG. 3, FIG. 3 is a schematic diagram showing a communication device 300 in accordance with a second embodiment of the present invention. As shown in FIG. 3, the communication device 300 includes an antenna unit 310, a sensing unit 321, a radio frequency unit 322 and a control unit 323, and the operation of which is similar to the antenna unit 110, the sensing unit 120, the radio frequency unit 130 and the control unit 150 of the embodiment of FIG. 1 and FIG. 2, and will not be repeated herein.

In the present embodiment, the sensing unit 321, the radio frequency unit 322 and the control unit 323 are integrated into one package 320. Specifically, besides the antenna unit 310, other units and components, such as the sensing unit 321, the radio frequency unit 322, the control unit 323, capacitive sensing unit (not shown), capacitor (not shown) and ground terminal (not shown), etc can be integrated into one package (i.e. package 320) by using a system in package (SIP) technology. Therefore, the fabrication cost of the communication device 300 can be saved, and arrangement flexibility of other components in the communication device 300 can be increased.

From the above, the antenna unit of the communication device itself is used to sense the capacitance value within an area range, so as to regulate the energy of the radio frequency signal (RFS). In the present invention, there is no need to additionally install the receiver or the sensor in the communication device 100. In addition, some components in the communication device can be integrated into one package to increase the arrangement flexibility of other components in the communication device.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A communication device, comprising:
   an antenna unit configured to transmit a radio frequency signal;
   a sensing unit coupled to a ground terminal through a first capacitor, wherein the sensing unit is configured to sense a capacitance value through the antenna unit; and
   a radio frequency unit configured to generate the radio frequency signal and to regulate energy of the radio frequency signal according to the capacitance value.

2. The communication device of claim 1, further comprising a control unit which is configured to generate and provide a control signal to the radio frequency unit according to the capacitance value, so as to regulate the energy of the radio frequency signal.

3. The communication device of claim 2, wherein when the capacitance value is greater than a threshold value, the radio frequency unit decreases the energy of the radio frequency signal according to the control signal.

4. The communication device of claim 3, wherein when the capacitance value is smaller than or equal to the threshold value, the radio frequency unit does not regulate the energy of the radio frequency signal according to the control signal.

5. The communication device of claim 2, wherein the sensing unit, the radio frequency unit and the control unit are integrated into one package.

6. The communication device of claim 2, wherein the first capacitor and the ground terminal are disposed in the control unit.

7. The communication device of claim 1, further comprising a capacitive sensing unit coupled between the antenna unit and the radio frequency unit.

8. The communication device of claim 7, wherein the capacitive sensing unit comprises a second capacitor.

9. The communication device of claim 1, wherein the sensing unit is coupled to the antenna unit.

10. The communication device of claim 1, wherein the sensing unit is configured to detect whether a human body approaches the communication device.

\* \* \* \* \*